(12) United States Patent
Dong et al.

(10) Patent No.: US 8,743,972 B2
(45) Date of Patent: Jun. 3, 2014

(54) CODING ADAPTIVE DEBLOCKING FILTER AND METHOD FOR USE THEREWITH

(75) Inventors: Ruijing (Ray) Dong, Toronto (CA); Elaine Poon, Scarborough (CA); Xu Gang (Wilf) Zhao, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1814 days.

(21) Appl. No.: 12/039,612

(22) Filed: Feb. 28, 2008

(65) Prior Publication Data

US 2009/0161770 A1 Jun. 25, 2009

Related U.S. Application Data

(60) Provisional application No. 61/015,357, filed on Dec. 20, 2007.

(51) Int. Cl.
*H04N 7/12* (2006.01)

(52) U.S. Cl.
USPC .................................. 375/240.29; 375/240.12

(58) Field of Classification Search
USPC ............. 375/240.01, 240.12, 240.16, 240.24, 375/240.35, 240.29
See application file for complete search history.

(56) References Cited

U.S. PATENT DOCUMENTS

| | | | |
|---|---|---|---|
| 6,285,801 B1 * | 9/2001 | Mancuso et al. | 382/268 |
| 6,925,123 B2 * | 8/2005 | Subramaniyan et al. | 375/240.16 |
| 7,054,964 B2 * | 5/2006 | Chan et al. | 710/65 |
| 7,283,588 B2 * | 10/2007 | Bjontegaard | 375/240.01 |
| 7,362,804 B2 * | 4/2008 | Novotny et al. | 375/240.01 |
| 7,606,311 B2 * | 10/2009 | Hsu et al. | 375/240.23 |
| 7,693,219 B2 * | 4/2010 | Yan | 375/240.16 |
| 7,738,564 B2 * | 6/2010 | Park et al. | 375/240.29 |
| 7,843,995 B2 * | 11/2010 | Bhaskaran et al. | 375/240.13 |
| 7,899,123 B2 * | 3/2011 | Xue et al. | 375/240.29 |
| 7,903,744 B2 * | 3/2011 | Bjontegaard | 375/240.29 |
| 8,009,740 B2 * | 8/2011 | Gordon | 375/240.25 |
| 8,139,651 B2 * | 3/2012 | Huang | 375/240.29 |
| 2007/0098077 A1 * | 5/2007 | Sun et al. | 375/240.18 |
| 2008/0043845 A1 * | 2/2008 | Nakaishi | 375/240.16 |

OTHER PUBLICATIONS

"ITU-T H.264: Series H: Audiovisual and Multimedia Systems Infrastructure of audiovisual services—Coding of moving video", ITU, May 2003.*

List et al. ,"Adaptive Deblocking Filter IEEE Transactions on Circuits and Systems for Video Technology", Jul. 2003.*

\* cited by examiner

*Primary Examiner* — Brian O'Connor
(74) *Attorney, Agent, or Firm* — Garlick & Markison; Bruce E. Stuckman

(57) ABSTRACT

A deblocking filter module can be used in a video processing device that processes a video input signal in accordance with a plurality of coding parameters. The deblocking filter module includes an adaptive deblocking filter that receives a plurality of samples and produces a plurality of filtered samples in response thereto, the adaptive deblocking filter having at least one filter parameter that is controllable in response to a filter control signal. A filter control module generates the filter control signal based on the plurality of coding parameters.

23 Claims, 13 Drawing Sheets

Video encoding operation

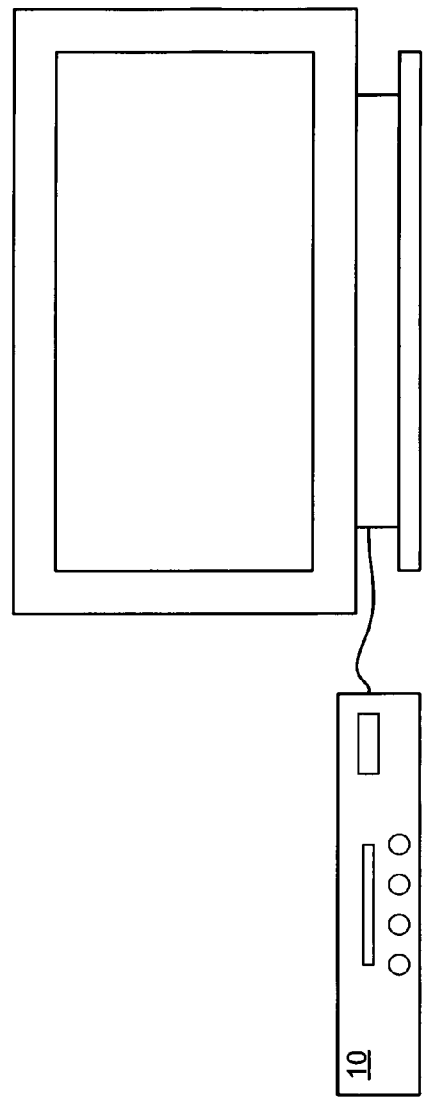
FIG. 1
FIG. 2
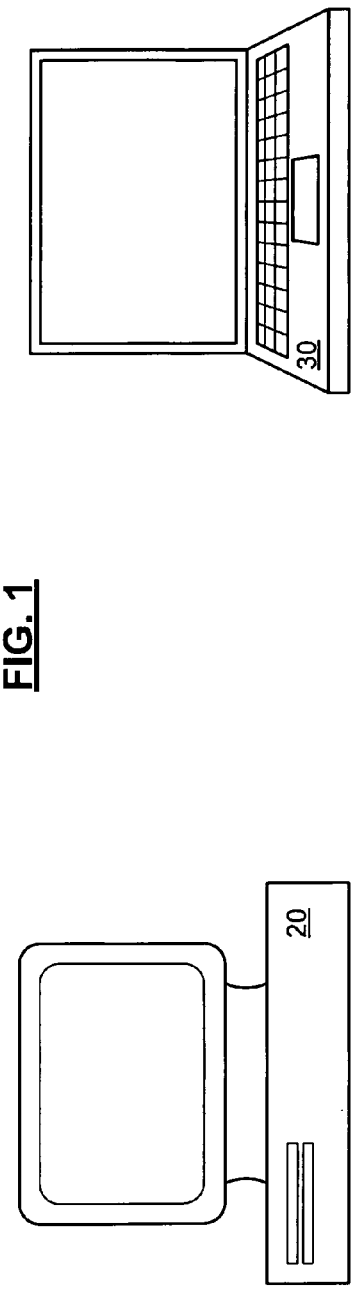
FIG. 3

Video encoding operation

Video decoding operation

CODING ADAPTIVE DEBLOCKING FILTER AND METHOD FOR USE THEREWITH

CROSS REFERENCE TO RELATED PATENTS

The present application claims priority under 35 U.S.C. 119 to provisionally filed U.S. Application No. 61/015,357 entitled, CODING ADAPTIVE DEBLOCKING FILTER AND METHOD FOR USE THEREWITH, filed on Dec. 20, 2007.

TECHNICAL FIELD OF THE INVENTION

The present invention relates to encoding used in devices such as video encoders/decoders and deblocking filters used therewith.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

The efficient encoding and decoding of video signals and the efficient implementation of encoder and decoders is important to the implementation of many video devices, particularly video devices that are destined for home use. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of various video devices in accordance with embodiments of the present invention.

DETAILED DESCRIPTION OF THE INVENTION INCLUDING THE PRESENTLY PREFERRED EMBODIMENTS

FIGS. 1-3 present pictorial diagram representations of various video devices in accordance with embodiments of the present invention. In particular, set top box 10 with built-in digital video recorder functionality or a stand alone digital video recorder, computer 20 and portable computer 30 illustrate electronic devices that incorporate a video device 125 that includes one or more features or functions of the present invention. While these particular devices are illustrated, video processing device 125 includes any device that is capable of encoding, decoding and/or transcoding video content in accordance with the methods and systems described in conjunction with FIGS. 4-15 and the appended claims.

Figure 4:
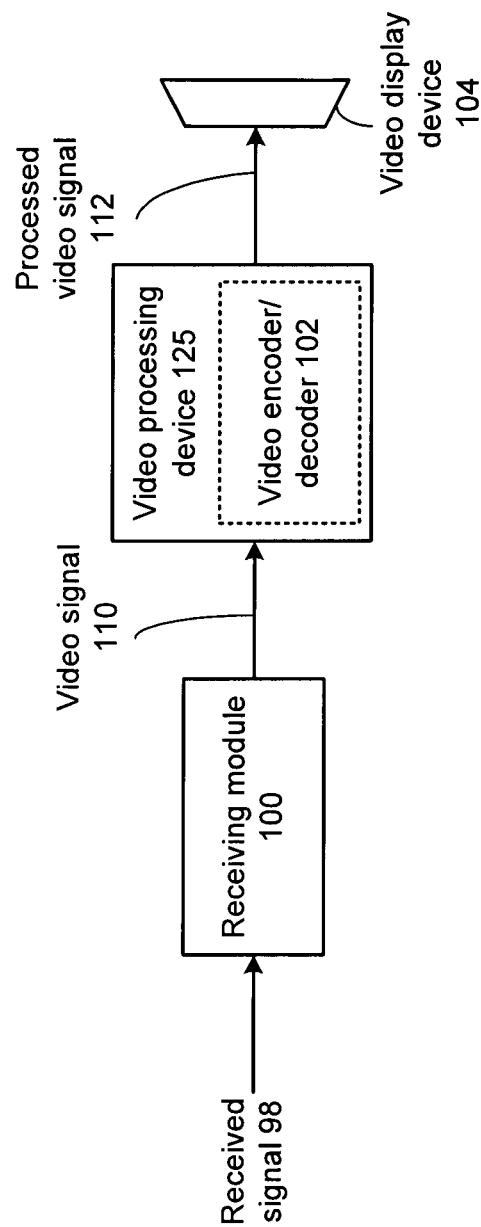
FIG. 4 presents a block diagram representation of a video device in accordance with an embodiment of the present invention.

FIG. 4 presents a block diagram representation of a video device in accordance with an embodiment of the present invention. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In accordance with the present invention, the video encoder/decoder 102 includes a deblocking filter module 222 that is adaptive, based on coding parameters used in encoding and/or decoding, to adjust the filter strength or other filter parameter. In particular, the coding parameters can include quantization parameters that can be further processed, edge strengths, macroblock type, transform type, an indication of whether macroblock adaptive frame field processing is enabled or disabled, or other coding parameters. Video encoder/decoder 102 and deblocking filter module 222 include many optional functions and features described in conjunction with FIGS. 5-15 that follow.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), Quicktime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 5:
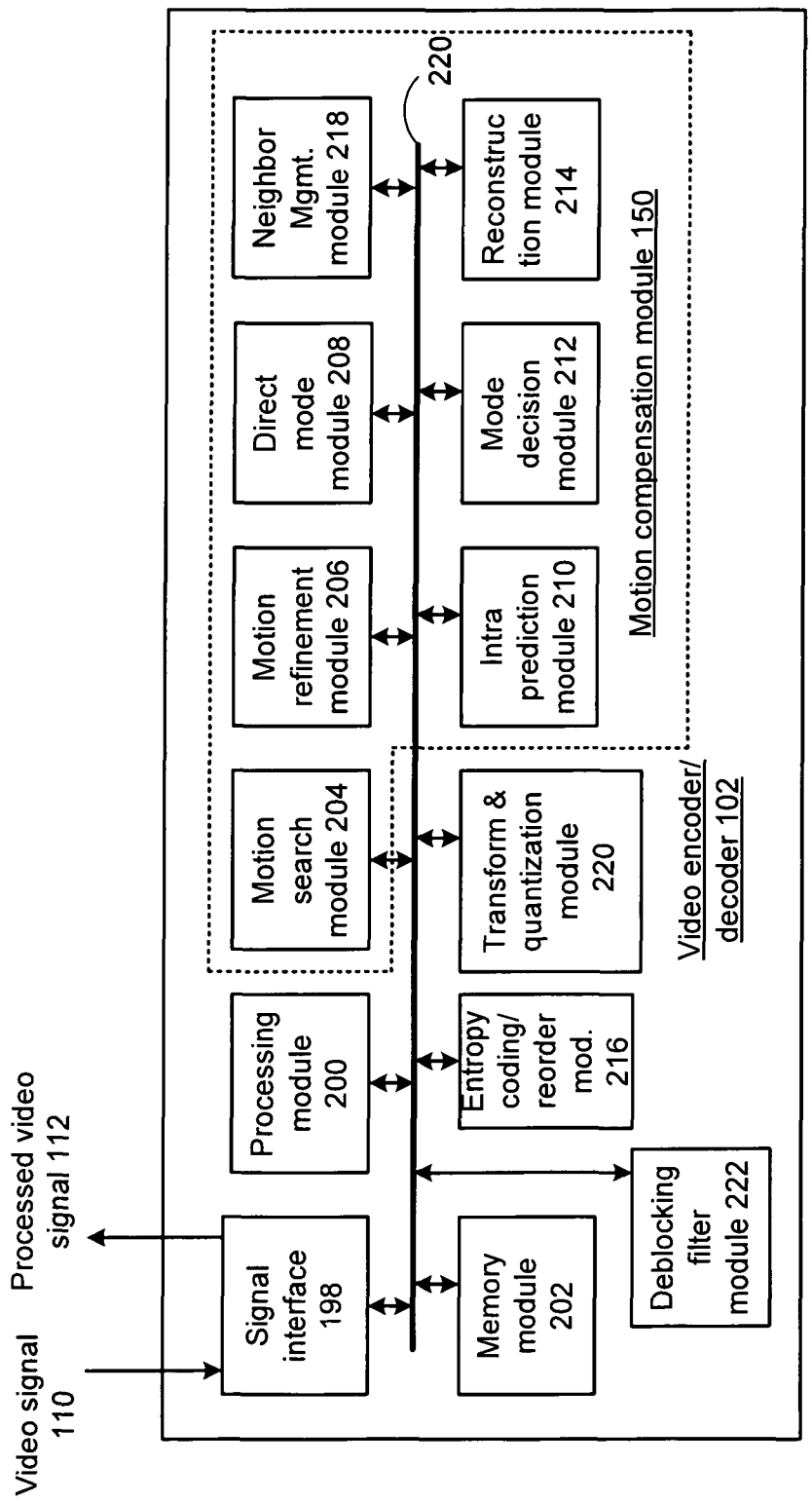
FIG. 5 presents a block diagram representation of a video encoder/decoder 102 in accordance with an embodiment of the present invention.

FIG. 5 presents a block diagram representation of a video encoder/decoder 102 in accordance with an embodiment of the present invention. In particular, video encoder/decoder 102 can be a video codec that operates in accordance with many of the functions and features of the H.264 standard, the MPEG-4 standard, VC-1 (SMPTE standard 421M) or other standard, to process processed video signal 112 to encode, decode or transcode video input signal 110. Video input signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220 and deblocking filter module 222. The modules of video encoder/decoder 102 can be implemented in software or firmware and be structured as operations performed by processing module 200. Alternatively, one or more of these modules can be implemented using a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present invention, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and more particularly an interpolation filter used therein, and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, deblocking filter module 222 or other function specific modules can be used in both the encoding and decoding process for similar purposes.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 10) that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion search module 204 is able to operate on a macroblock to contemporaneously determine the motion search motion vector for each subblock of the macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the a sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video input signal 110, to contemporaneously determine the refined motion vector for each macroblock in the row.

A direct mode module 208 generates a direct mode motion vector for each macroblock, based on macroblocks that neighbor the macroblock. In an embodiment of the present invention, the direct mode module 208 operates to determine the direct mode motion vector and the cost associated with the direct mode motion vector based on the cost for candidate direct mode motion vectors for the B slices of video input signal 110, such as in a fashion defined by the H.264 standard.

While the prior modules have focused on inter-prediction of the motion vector, intra-prediction module 210 generates a best intra prediction mode for each macroblock of the plurality of macroblocks. In an embodiment of the present invention, intra-prediction module 210 operates as defined by the H.264 standard, however, other intra-prediction techniques can likewise be employed. In particular, intra-prediction module 210 operates to evaluate a plurality of intra prediction modes such as a Intra-4×4 or Intra-16×16, which are luma prediction modes, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entropy coding module 216, filtered by de-blocking filter module 222. In an embodiment of the present invention, further formatting and/or buffering can optionally be performed by signal interface 198 and the processed video signal 112 can be represented as being output therefrom.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. In an embodiment of the present invention, a data structure, such as a linked list, array or one or more registers are used to associate and store neighbor data for each macroblock in a buffer, cache, shared memory or other memory structure. Neighbor data includes motion vectors, reference indices, quantization parameters, coded-block patterns, macroblock types, intra/inter prediction module types neighboring pixel values and or other data from neighboring macroblocks and/or subblocks used to by one or more of the modules or procedures of the present invention to calculate results for a current macroblock. For example, in order to determine the predicated motion vector for the motion search module 204 and motion refinement module 206, both the motion vectors and reference index of neighbors are required. In addition to these data, the direct mode module 208 requires the motion vectors of the co-located macroblock of previous reference pictures. The deblocking filter module 222 operates according to a set of filtering strengths determined by using the neighbors' motion vectors, quantization parameters, reference index, and coded-block-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

In an embodiment of the present invention, when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can be therefore be more streamline and faster. In other words, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB(x+1,y−1) and MB(x−1,y) neighbor data is stored for each neighboring macroblock corresponding to each of these macroblocks that are yet to be processed, including MB(x,y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the H.264 standard, the MPEG-4 standard, VC-1 (SMPTE standard 421M) or by other standard or other means.

While not expressly shown, video encoder/decoder 102 can include a memory cache, shared memory, a memory management module, a comb filter or other video filter, and/or other module to support the encoding of video input signal 110 into processed video signal 112.

Further details of specific encoding and decoding processes will be described in greater detail in conjunction with FIGS. 6 and 7.

Figure 6:
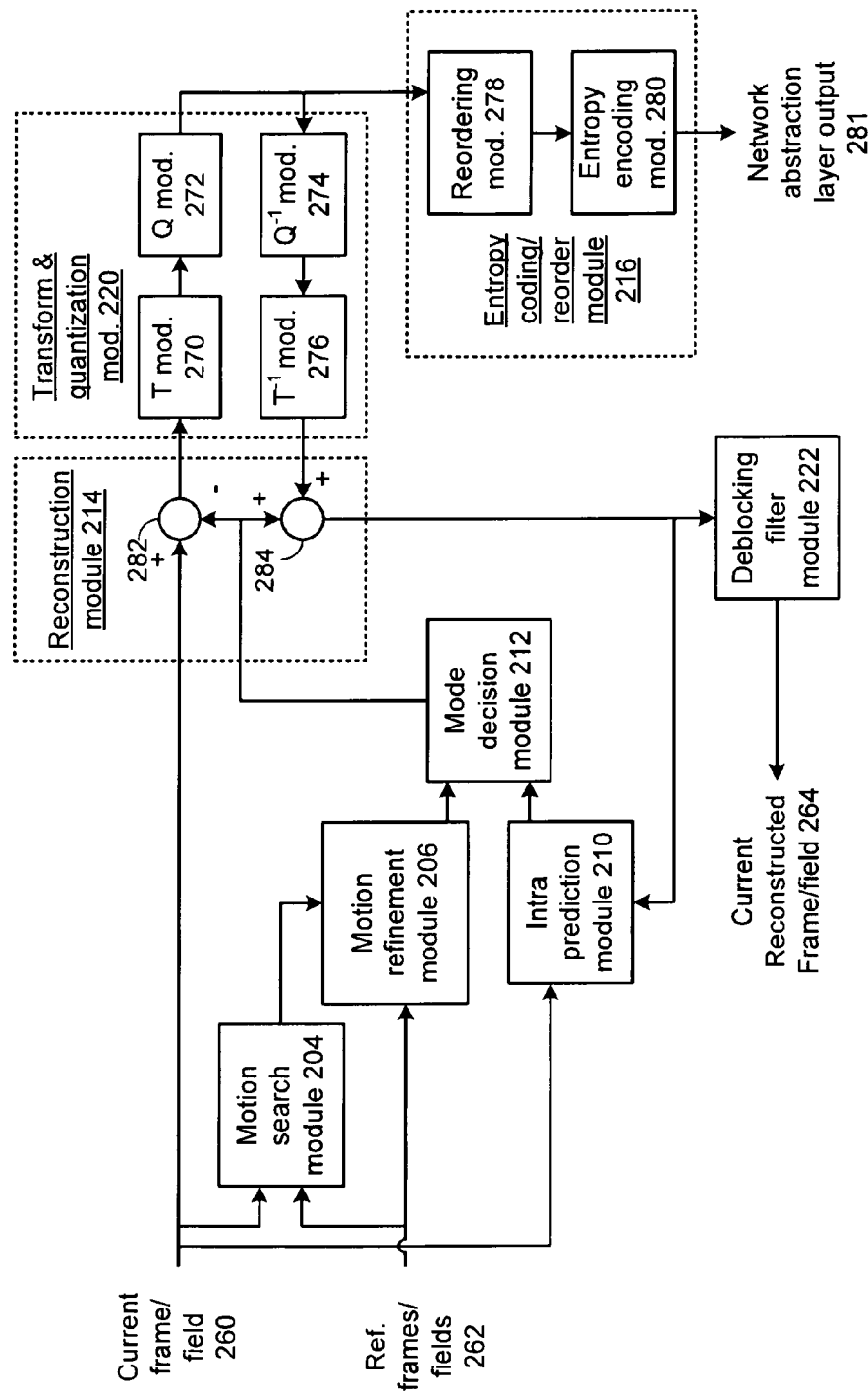
FIG. 6 presents a block flow diagram of a video encoding operation in accordance with an embodiment of the present invention.

FIG. 6 presents a block flow diagram of a video encoding operation in accordance with an embodiment of the present invention. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. It should also be noted that current reconstructed frames/fields 264 can be buffered to generate reference frames/fields 262 for future current frames/fields 260. Deblocking filter module 222 will be discussed in greater detail in conjunction with FIGS. 8, 9 and 15 that follow.

As discussed in conjunction with FIG. 5, one or more of the modules of video encoder/decoder 102—including the deblocking filter module 222, can also be used in the decoding process as will be described further in conjunction with FIG. 7.

Figure 7:
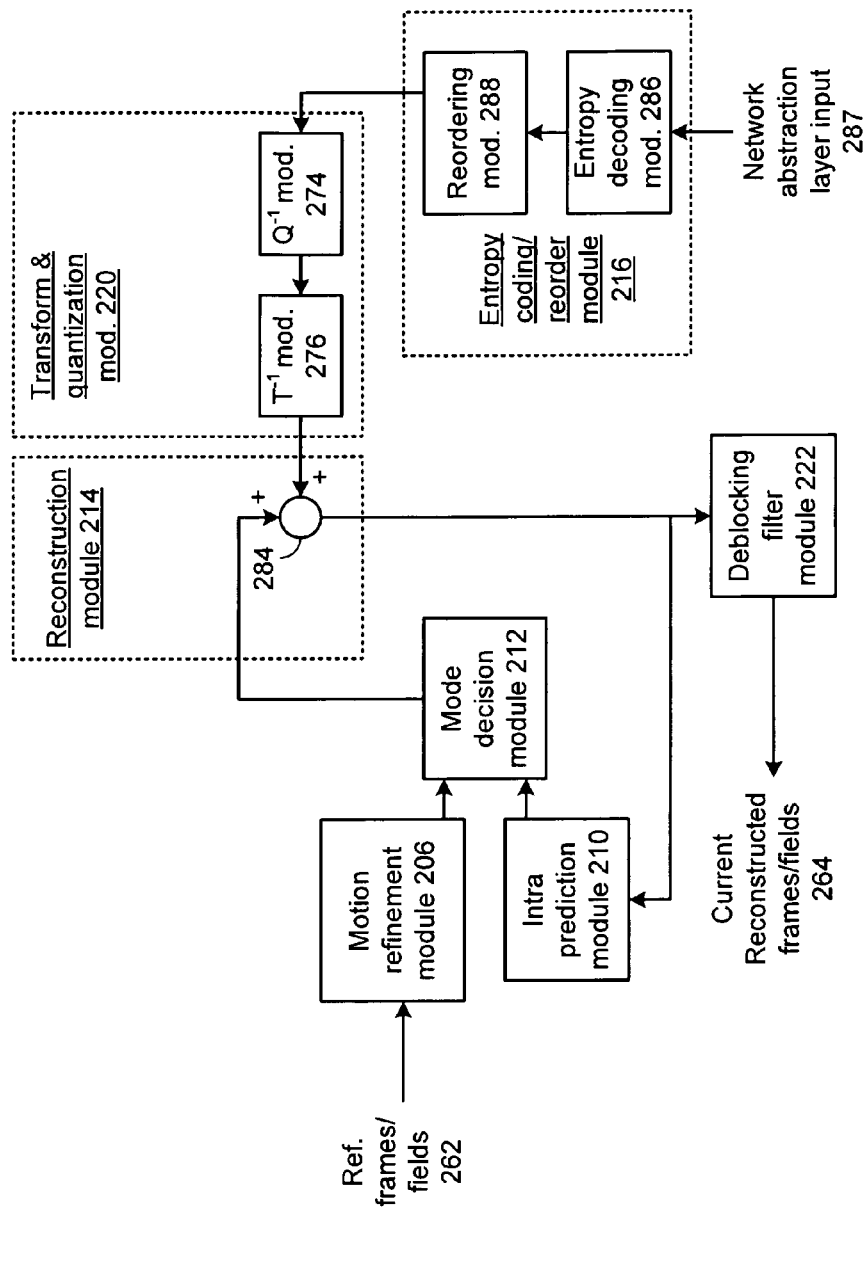
FIG. 7 presents a block flow diagram of a video decoding operation in accordance with an embodiment of the present invention.

FIG. 7 presents a block flow diagram of a video decoding operation in accordance with an embodiment of the present invention. In particular, this video decoding operation contains many common elements described in conjunction with FIG. 6 that are referred to by common reference numerals. In this case, the motion refinement module 206, the intra-prediction module 210, the mode decision module 212, and the deblocking filter module 222 are each used as described in conjunction with FIG. 6 to process reference frames/fields 262. In addition, the reconstruction module 214 reuses the adding circuit 284 and the transform and quantization module reuses the inverse transform module 276 and the inverse quantization module 274. In should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 6 and 7, the present invention can likewise be similarly employed to the other embodiments of the present invention described in conjunction with FIGS. 1-5 and 8-15 and/or with other function specific modules used in conjunction with video encoding and decoding.

Figure 8:
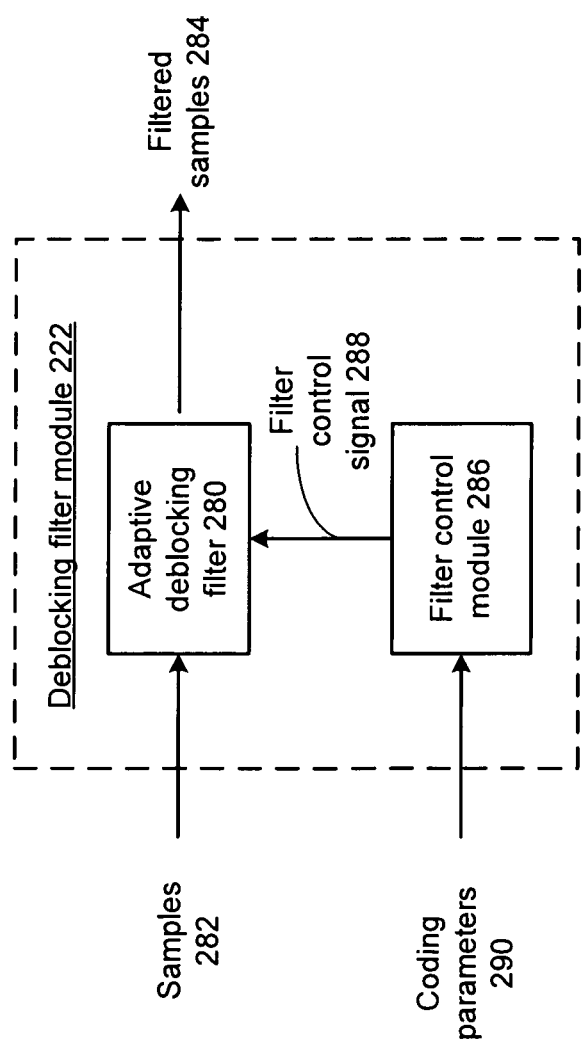
FIG. 8 presents a block diagram representation of a deblocking filter module 222 in accordance with an embodiment of the present invention.

FIG. 8 presents a block diagram representation of a deblocking filter module 222 in accordance with an embodiment of the present invention. In particular, deblocking filter 222 includes an adaptive deblocking filter 280 that receives a plurality of samples 282, such as from reconstruction module 214, and that produces a plurality of filtered samples 284 in response thereto. The adaptive deblocking filter 280 can be a digital deblocking filter that is implemented in software, hardware or firmware, having at least one filter parameter that is controllable in response to a filter control signal 288. In an embodiment of the present invention, the filter strength of adaptive deblocking filter 280 is controllable based on the filter control signal, however, in addition or in the alternative, other filter parameters such as gains, filter coefficients, orders filter types, etc. can also be controlled based on the filter control signal 288

Filter control module 286 generates the filter control signal 288 based on a plurality of coding parameters 290. In particular, the coding parameters 290 can include quantization parameters that can be further processed, edge strengths, macroblock type, transform type, an indication of whether macroblock adaptive frame field processing is enabled or disabled, or other parameters associated with the coding or decoding of the video signal 110 and processed video signal 112. In particular, the filter control module 286 can generate the filter control signal 288, and the adaptive deblocking filter 280 can adapt, on a macroblock by macroblock basis based on the coding of each macroblock to customize the filtering based on the particular coding parameters 290 employed.

As discussed above, the coding parameters 290 include a plurality of quantization parameters of an encoded video signal, such as a plurality of quantization parameters corresponding to pixels along edges of the macroblock, such as the top horizontal edge and/or left vertical edge of a macroblock that border other neighboring macroblocks or other edges including internal edges. In an embodiment of the present invention, filter control module 286 processes the plurality of quantization parameters to generate a plurality of processed quantization parameters, and generates the filter control signal based on the processed quantization parameters. For instance, a single quantization parameter can be used to represent a plurality of pixels, such as 2, 3, 4, 6 or 8 pixels. The horizontal and/or internal edges of a macroblock are processed to generate one processed quantization parameter for each M pixels and vertical edges of a macroblock are processed to generate one processed quantization parameter for each N pixels. The values of M and N can be the same or different, and can be predetermined or vary.

Further video encoder/decoder 102 can operate in a first mode with macroblock adaptive frame and field (MBAFF) processing enabled and a second mode with MBAFF processing disabled and the coding parameters 290 can include a MBAFF flag that indicates when MBAFF processing is enabled or disabled, and the macroblock type of the current macroblock and of neighboring macroblocks. The macroblock type can include frame or field, top frame, bottom frame, top field and bottom field when macroblock pairs are processed as will be discussed in greater detail in conjunction with FIG. 10. In one implementation M=4, and N=4 when MBAFF processing is disabled, and M=4 and N=2 when MBAFF processing is enabled. Further the value of N can be varied based on the current macroblock type, the macroblock type of the neighboring macroblocks and the relationship between the macroblock type of the current and neighboring macroblocks.

In an embodiment of the present invention, the adaptive deblocking filter 280 operates on samples 282 that include transform blocks based on 8×8 or 4×4 discrete cosine transforms of chroma and luma data. The coding parameters 290 further include horizontal and vertical edges strengths for a macroblock boundary and internal edge strengths corresponding to the horizontal and vertical edges of the transform blocks, such as any 4×4 edges that are present in the macroblock that can indicate whether a block edge corresponds to a macroblock boundary. In addition, coding parameters 290 can include an indicator of the transform type, such as whether 8×8 or 4×4 discrete cosine transforms are used or that indicates some other transform technique.

The coding parameters 290 can be stored in a look-up table, buffer, cache or other memory structure to be retrieved by filter control module 286 when each macroblock or macroblock pair is processed. In an embodiment the coding parameter 290 are stored in an array that allocates memory for storing:
1. a frame or field indicator of the current macroblock pair;
2. a frame or field indicator of the macroblock pair above the current macroblock;
3. quantization parameters for the top and bottom macroblocks of the pair and the neighboring top macroblock pair;
4. vertical and horizontal macroblock edge strengths for macroblock pair boundaries and internal edge strengths;
5. a transform indicator;
6. an MBAFF flag Other data structures and other coding parameters can likewise be used in other embodiments of the present invention.

A single vertical macroblock edge strength can be assigned by pixel or by 2 pixels. The following examples describe various scenarios based on whether MBAFF is on or off. Further, when MBAFF is on, whether the current macroblock and the macroblock to the left are of the same type (field-field or frame-frame) or different types (frame-field or field-frame).

In the first case, MBAFF is on and the macroblock pair to the left of the current macroblock pair is of the same type (field-field or frame-frame). There macroblock edge strength can be stored as eight values vmes[0]-vmes[7]. In practice there can be additional redundancy, for instance, vmes[0] is equal to vmes[1], and vmes[2] is equal to vmes[3], vmes[4] is equal to vmes[5], and vmes[6] is equal to vmes[7]. Table 1 below presents the relationship between the luma and chroma strengths for each pixel and the vertical macroblock edge strength values on the left macroblock edge.

TABLE 1

(Vertical Macroblock Edge Strength Table
MBAFF on and same field-frame type)

| No of Pixel | Luma[16] | Chorma[8] |
|---|---|---|
| 0 | vmes[0] | vmes[0] |
| 1 | vmes[0] | vmes[0] |
| 2 | vmes[1] | vmes[2] |
| 3 | vmes[1] | vmes[2] |
| 4 | vmes[2] | vmes[4] |
| 5 | vmes[2] | vmes[4] |
| 6 | vmes[3] | vmes[6] |
| 7 | vmes[3] | vmes[6] |
| 8 | vmes[4] | NA |
| 9 | vmes[4] | NA |
| 10 | vmes[5] | NA |
| 11 | vmes[5] | NA |
| 12 | vmes[6] | NA |
| 13 | vmes[6] | NA |
| 14 | vmes[7] | NA |
| 15 | vmes[7] | NA |

In the next case, MBAFF is on and the left macroblock pair is field mode, and current macroblock pair is frame mode. The assignment of the vertical macroblock edge strength is shown in Table 2 below.

TABLE 2

Vertical Macroblock Edge Strength Table
(MBAFF on, left frame, current field)

| No of Pixel | Luma[16] | Chorma[8] |
|---|---|---|
| 0 | vmes[0] | vmes[0] |
| 1 | vmes[1] | vmes[1] |
| 2 | vmes[0] | vmes[2] |
| 3 | vmes[1] | vmes[3] |
| 4 | vmes[2] | vmes[4] |
| 5 | vmes[3] | vmes[5] |
| 6 | vmes[2] | vmes[6] |
| 7 | vmes[3] | vmes[7] |
| 8 | vmes[4] | NA |
| 9 | vmes[5] | NA |
| 10 | vmes[4] | NA |
| 11 | vmes[5] | NA |
| 12 | vmes[6] | NA |
| 13 | vmes[7] | NA |
| 14 | vmes[6] | NA |
| 15 | vmes[7] | NA |

In the next case, MBAFF is on and the left macroblock pair is frame mode, and current macroblock pair is field mode. The assignment of the vertical macroblock edge strength is shown in Table 3 below.

TABLE 3

Vertical Macroblock Edge Strength Table
(MBAFF on, left field, current frame)

| No of Pixel | Luma[16] | Chorma[8] |
|---|---|---|
| 0 | vmes[0] | vmes[0] |
| 1 | vmes[0] | vmes[1] |
| 2 | vmes[1] | vmes[2] |
| 3 | vmes[1] | vmes[3] |
| 4 | vmes[2] | vmes[4] |
| 5 | vmes[2] | vmes[5] |
| 6 | vmes[3] | vmes[6] |
| 7 | vmes[3] | vmes[7] |
| 8 | vmes[4] | NA |
| 9 | vmes[4] | NA |
| 10 | vmes[5] | NA |
| 11 | vmes[5] | NA |
| 12 | vmes[6] | NA |
| 13 | vmes[6] | NA |
| 14 | vmes[7] | NA |
| 15 | vmes[7] | NA |

When MBAFF is off no matter what type of picture current picture is, i.e. frame or field, for luma, pixel [0, 3], pixel [4,7], pixel [8,11], pixel [12, 15] share one strength, and the whole edge shares one QP. The relation between the pixel strength and vertical macroblock edge strength is shown in Table 4 below.

TABLE 4

Vertical Macroblock Edge Strength Table
(MBAFF off)

| No of Pixel | Luma[16] | Chorma[8] |
|---|---|---|
| 0 | vmes[0] | vmes[0] |
| 1 | vmes[0] | vmes[0] |
| 2 | vmes[1] | vmes[2] |
| 3 | vmes[1] | vmes[2] |
| 4 | vmes[2] | vmes[4] |
| 5 | vmes[2] | vmes[4] |
| 6 | vmes[3] | vmes[6] |
| 7 | vmes[3] | vmes[6] |
| 8 | vmes[4] | NA |
| 9 | vmes[4] | NA |
| 10 | vmes[5] | NA |
| 11 | vmes[5] | NA |
| 12 | vmes[6] | NA |
| 13 | vmes[6] | NA |
| 14 | vmes[7] | NA |
| 15 | vmes[7] | NA |

For the internal edges, every 4 pixels share 1 strength value. The internal vertical strength has 4 elements on each of the 3 edges. Each element presents 4 pixels. For horizontal macroblock edge strengths, each strength element can also represent 2 or 4 pixels. A special case occurs when MBAFF is on and the current macroblock pair is in frame format and the macroblock pair above is in field format. In this case two sets of macroblock edge strengths are required, one corresponding to the top field macroblock and a second corresponding to the bottom field macroblock for the macroblock pair above the current macroblock pair.

While a specific example has been presented above, other implementations are likewise possible within the broad scope of the present invention.

Figure 9:
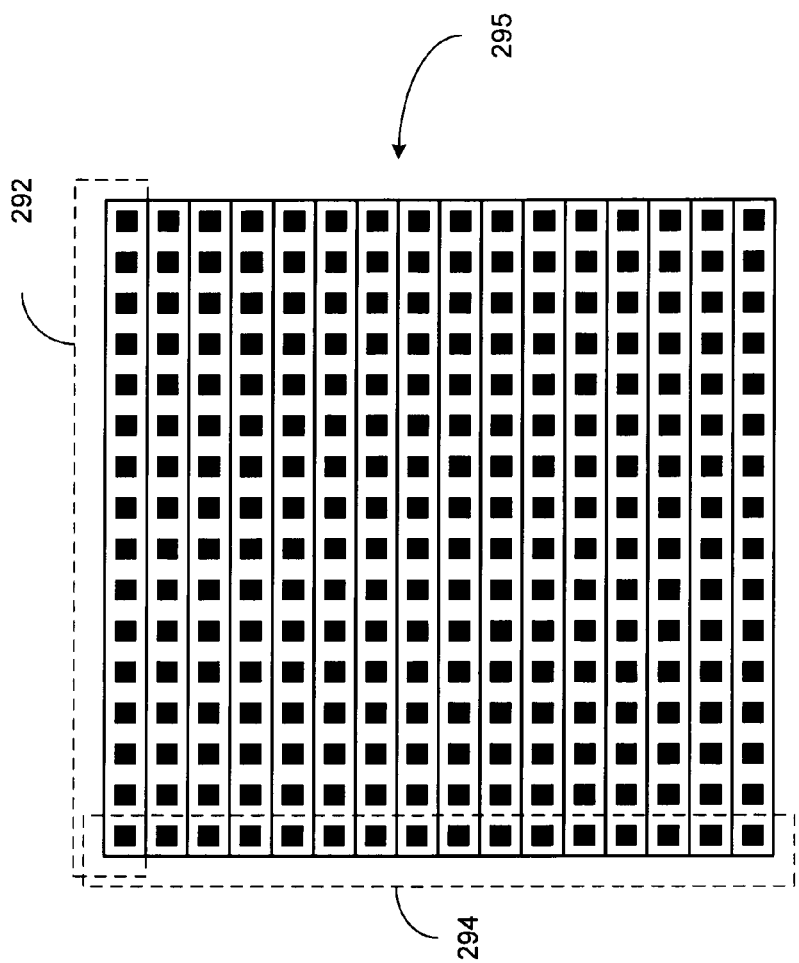
FIG. 9 presents a graphical representation of a macroblock in accordance with an embodiment of the present invention.

FIG. 9 presents a graphical representation of a macroblock in accordance with an embodiment of the present invention. In particular a 16×16 macroblock 295 that includes a horizontal edge 292 and a vertical edge 294. As discussed in conjunction with FIG. 8, multiple pixels of each edge can share a single quantization parameter. As discussed above, the number of pixels that share a single quantization parameter can vary based on whether MBAFF is enabled or disabled, whether the edge is a vertical or horizontal edge, and based on the macroblock type of the current macroblock and the type of neighboring macroblocks, such as the macroblock above the current macroblock.

Figure 10:
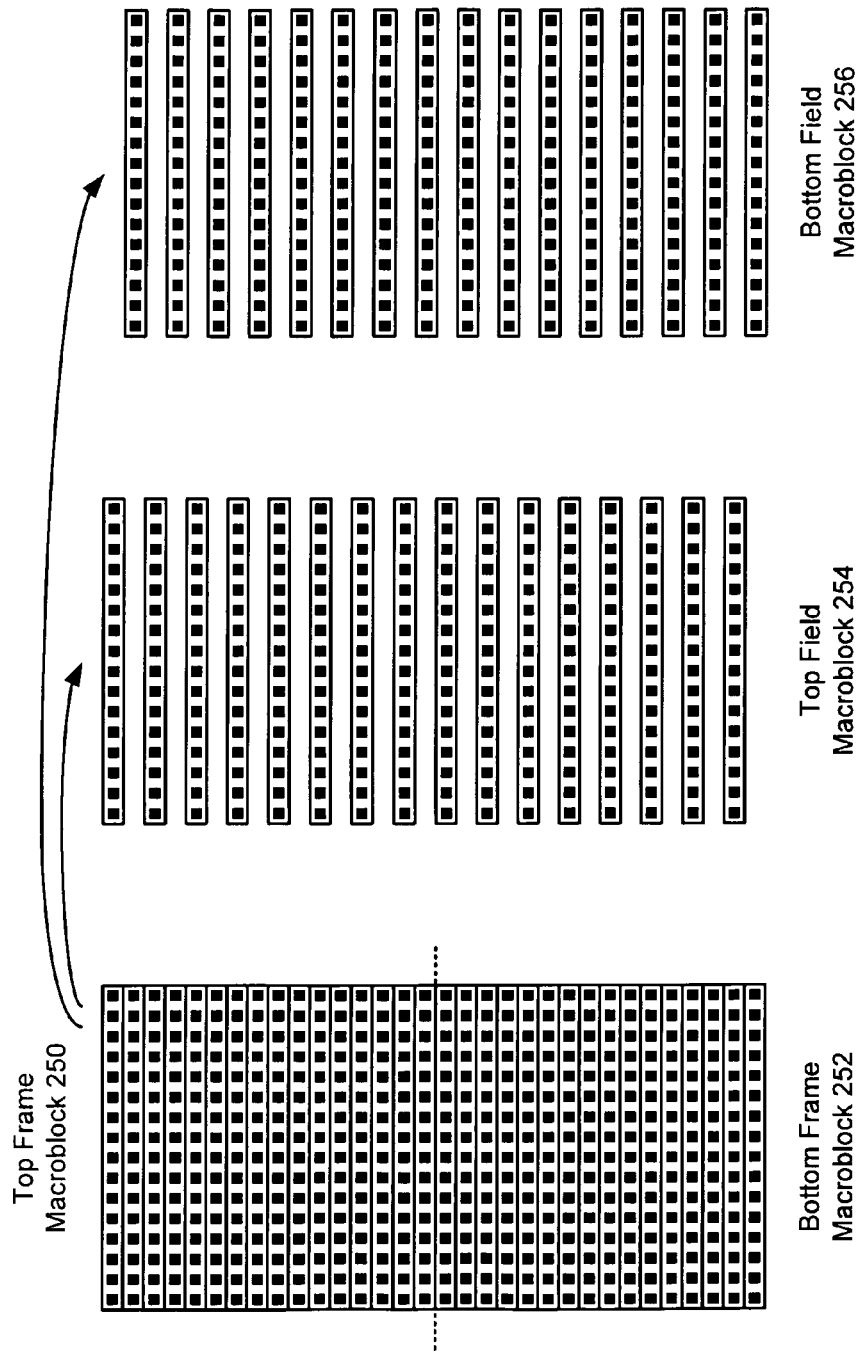
FIG. 10 presents a graphical representation of the relationship between example top frame and bottom frame macroblocks (250, 252) and example top field and bottom field macroblocks (254, 256) in accordance with an embodiment of the present invention.

FIG. 10 presents a graphical representation of the relationship between exemplary top frame and bottom frame macroblocks (250, 252) and exemplary top field and bottom field macroblocks (254, 256). As discussed in conjunction with FIG. 9, deblocking filter module 222 can operate on stored macroblock data that corresponds to such a macroblock pair in either frame or field mode, that includes top frame macroblock 250, bottom frame macroblock 252 or top field macroblock 254 and bottom field macroblock 256, as well as neighbor data from the macroblock pair above the current macroblock stored in the conjunction with the processing of the prior macroblocks (when the neighbor above was the current macroblock), whether the macroblocks themselves were processed in frame or in field mode, and can be accessed in the processing of the macroblock of interest by retrieval directly from memory, with or without a look-up table and without further processing.

Figure 11:
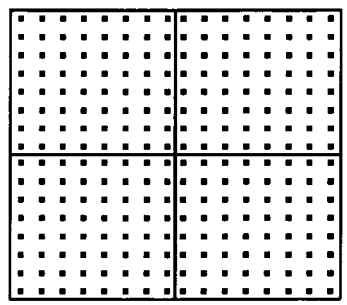
FIG. 11 presents a graphical representation that shows example macroblock partitioning in accordance with an embodiment of the present invention.
Figure 11:
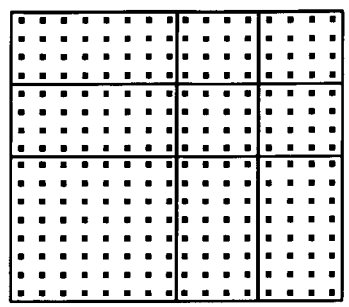
Figure 11:
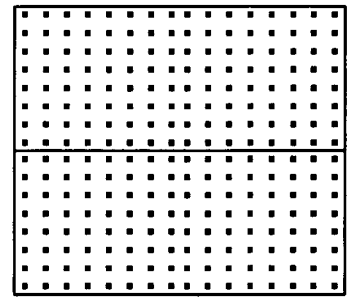
Figure 11:
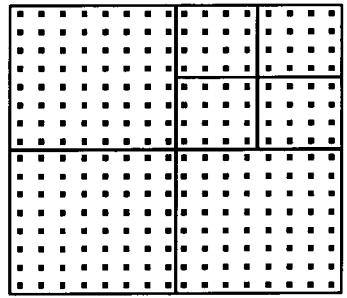

FIG. 11 presents a graphical representation of exemplary partitionings of a macroblock of a video input signal into subblocks. While the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side. The subblocks can be dealt with in the same way as macroblocks. For example, motion search module 204 can generate separate motion search motion vectors for each subblock of each macroblock, etc.

Macroblock 300, 302, 304 and 306 represent examples of partitioning into subblocks in accordance with the H.264 standard. Macroblock 300 is a 16×16 macroblock that is partitioned into two 8×16 subblocks. Macroblock 302 is a 16×16 macroblock that is partitioned into three 8×8 subblocks and four 4×4 subblocks. Macroblock 304 is a 16×16 macroblock that is partitioned into four 8×8 subblocks. Macroblock 306 is a 16×16 macroblock that is partitioned into an 8×8 subblock, two 4×8 subblocks, two 8×4 subblocks, and four 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of partitions of a particular macroblock. The result however can yield more accurate motion compensation and reduced compression artifacts in the decoded video image.

Figure 12:
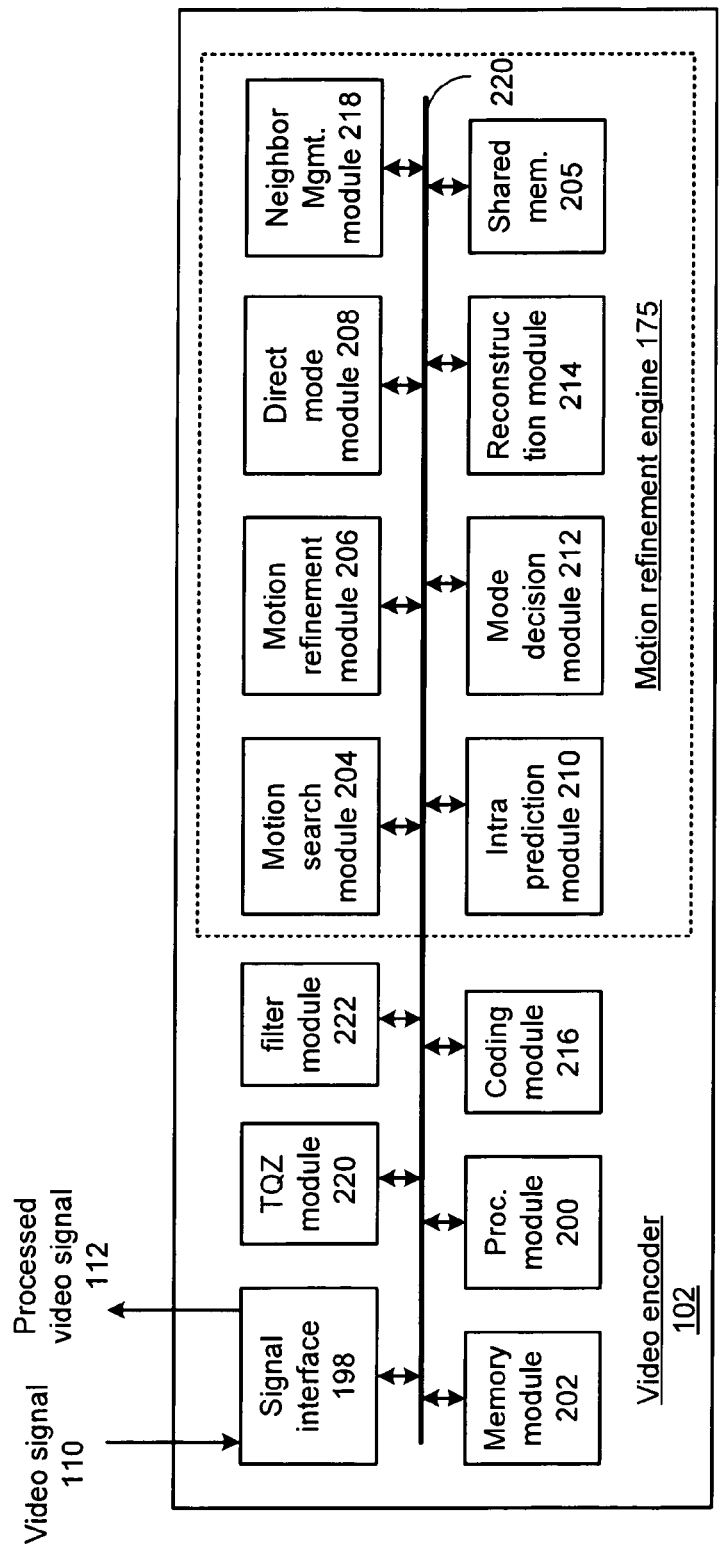
FIG. 12 presents a block diagram representation of a video encoder/decoder 102 that includes motion refinement engine 175 in accordance with an embodiment of the present invention.

FIG. 12 presents a block diagram representation of a video encoder/decoder 102 that includes motion refinement engine 175 in accordance with an embodiment of the present invention. In addition to modules referred to by common reference numerals used to refer to corresponding modules of previously described embodiments, motion refinement engine 175 includes a shared memory 205 that can be implemented separately from, or part of, memory module 202. In addition, motion refinement engine 175 can be implemented in a special purpose hardware configuration that has a generic design capable of handling sub-pixel search using different reference pictures—either frame or field and either forward in time, backward in time or a blend between forward and backward. Motion refinement engine 175 can operate in a plurality of compression modes to support a plurality of different compression algorithms such as H.264, MPEG-4, VC-1, etc. in an optimized and single framework. Reconstruction can be performed for chroma only, luma only or both chroma and luma.

For example, the capabilities of these compression modes can include:

H.264:
 1. Motion search and refinement on all large partitions into subblocks of size (16×16), (16×8), (8×16) and (8×8) for forward/backward and blended directions when MBAFF is ON. This also includes field and frame MB types.
 2. Motion search and refinement on all partitions into subblocks of size (16×16), (16×8), (8×16) and (8×8), and subpartitions into subblocks of size (8×8), (8×4), (4×8), and (4×4) for forward/backward and blended directions when MBAFF is OFF.
 3. Computation of direct mode and/or skip mode cost for MBAFF ON and OFF.
 4. Mode decision is based on all the above partitions for MBAFF ON and OFF. The chroma reconstruction for the corresponding partitions is implicitly performed when the luma motion reconstruction is invoked.
 5. Motion refinement and compensation include quarter pixel accurate final motion vectors using the 6 tap filter algorithms of the H.264 standard.

VC-1:
 1. Motion search and refinement for both 16×16 and 8×8 partitions for both field and frame cases for forward, backward and blended directions.
 2. Mode decision is based on each of the partitions above. This involves the luma and corresponding chroma reconstruction.
 3. Motion refinement and compensation include bilinear half pixel accurate final motion vectors of the VC-1 standard.

MPEG-4:
 1. Motion search and refinement for both 16×16 and 8×8 partitions for both field and frame cases for forward, backward and blended directions.
 2. Mode decision is based on all of the partitions above. Reconstruction involves the luma only.
 3. Motion refinement and compensation include bilinear half pixel accurate MVs of the VC-1 standard.

Further, motion refinement engine 175 can operate in two basic modes of operation (1) where the operations of motion refinement module 206 are triggered by and/or directed by software/firmware algorithms included in memory module 202 and executed by processing module 200; and (2) where operations of motion refinement module 206 are triggered by the motion search module 204, with little or no software/firmware intervention. The first mode operates in accordance with one or more standards, possibly modified as described herein. The second mode of operation can be dynamically controlled and executed more quickly, in an automated fashion and without a loss of quality.

Shared memory 205 can be individually, independently and contemporaneously accessed by motion search module 204 and motion refinement module 206 to facilitate either the first or second mode of operation. In particular, shared memory 205 includes a portion of memory, such as a cost table that stores results (such as motion vectors and costs) that result from the computations performed by motion search module 204. This cost table can include a plurality of fixed locations in shared memory where these computations are stored for later retrieval by motion refinement module 206, particularly for use in the second mode of operation. In addition, to the cost table, the shared memory 205 can also store additional information, such as a hint table, that tells the motion refinement module 206 and the firmware of the decisions it makes for use in either mode, again based on the computations performed by motion search module 204. Examples include: identifying which partitions are good, others that are not as good and/or can be discarded; identifying either frame mode or field mode as being better and by how much; and identifying which direction, amongst forward, backward and blended is good and by how much, etc.

The motion search module may terminate its computations early based on the results it obtains. In any case, motion search can trigger the beginning of motion refinement directly by a trigger signal sent from the motion search module 204 to the motion refinement module 206. Motion refinement module 206 can, based on the data stored in the hint table and/or the cost table, have the option to refine only particular partitions, a particular mode (frame or field), and/or a particular direction (forward, backward or blended) that either the motion search module 204 or the motion refinement module 206 determines to be good based on a cost threshold or other performance criteria. In the alternative, the motion refinement module can proceed directly based on software/firmware algorithms in a more uniform approach. In this fashion, motion refinement engine 175 can dynamically and selectively operate so as to complete the motion search and motion refinement, pipelined and in parallel, such that the refinement is performed for selected partitions, all the subblocks for a single partition, group of partitions or an entire MB/MB pair on both a frame and field basis, on only frame or field mode basis, and for forward, backward and blended directions of for only a particular direction, based on the computations performed by the motion search module 204.

In operation, motion search module 204 contemporaneously generates a motion search motion vector for a plurality of subblocks for a plurality of partitionings of a macroblock of a plurality of MB/MB pairs. Motion refinement module 206, when enabled, contemporaneously generates a refined motion vector for the plurality of subblocks for the plurality of partitionings of the MB/MB pairs of the plurality of macroblocks, based on the motion search motion vector for each of the plurality of subblocks of the macroblock of the plurality of macroblocks. Mode decision module selects a selected partitioning of the plurality of partitionings, based on costs associated with the refined motion vector for each of the plurality of subblocks of the plurality of partitionings, of the macroblock of the plurality of macroblocks, and determines a final motion vector for each of the plurality of subblocks corresponding to the selected partitioning of the macroblock of the plurality of macroblocks. Reconstruction module 214 generates residual pixel values, for chroma and/or luma, corresponding to a final motion vector for the plurality of subblocks of the macroblock of the plurality of macroblocks.

Further, the motion search module 204 and the motion refinement module 206 can operate in a plurality of other selected modes including modes corresponding to different compression standards, and wherein the plurality of partitionings can be based on the selected mode. For instance, in one mode, the motion search module 204 and the motion refinement module 206 are capable of operating with macroblock adaptive frame and field (MBAFF) enabled when a MBAFF signal is asserted and with MBAFF disabled when the MBAFF enable signal is deasserted, and wherein the plurality of partitionings are based on the MBAFF enable signal. In an embodiment, when the MBAFF signal is asserted, the plurality of partitionings of the macroblock partition the macroblock into subblocks having a first minimum dimension of sizes 16 pixels by 16 pixels, 16 pixels by 8 pixels, 8 pixels by 16 pixels, and 8 pixels by 8 pixels—having a minimum dimension of 8 pixels. Further, when the MBAFF signal is deasserted, the plurality of partitionings of the macroblock partition the macroblock into subblocks having a second minimum dimension of sizes 16 pixels by 16 pixels, 16 pixels by 8 pixels, 8 pixels by 16 pixels, 8 pixels by 8 pixels, 4 pixels by 8 pixels, 8 pixels by 4 pixels, and 4 pixels by 4 pixels—having a minimum dimension of 4 pixels. In other modes of operation, the plurality of partitionings of the macroblock partition the macroblock into subblocks of sizes 16 pixels by 16 pixels, and 8 pixels by 8 pixels. While particular macroblock dimensions are described above, other dimensions are likewise possible with the scope of the present invention.

In addition to the partitionings of the MB/MB pairs being based on the particular compression standard employed, motion search module 204 can generate a motion search motion vector for a plurality of subblocks for a plurality of partitionings of a macroblock of a plurality of macroblocks and generate a selected group of the plurality of partitionings based on a group selection signal. Further, motion refinement module 206 can generate the refined motion vector for the plurality of subblocks for the selected group of the plurality of partitionings of the macroblock of the plurality of macroblocks, based on the motion search motion vector for each of the plurality of subblocks of the macroblock of the plurality of macroblocks. In this embodiment, the group selection signal can be used by the motion search module 204 to selectively apply one or more thresholds to narrow down the number of partitions considered by motion refinement module 206 in order to speed up the algorithm.

For example, when the group selection signal has a first value, the motion search module 204 determines the selected group of the plurality of partitionings by comparing, for the plurality of partitionings of the macroblock of the plurality of macroblocks, the accumulated costs associated with the motion search motion vector for each of the plurality of subblocks with a first threshold, and assigning the selected group to be a partitioning with the accumulated cost that compares favorably to the first threshold. In this mode, if a particular partitioning is found that generates a very good cost, the motion search module 204 can terminate early for the particular macroblock and motion refinement module 206 can operate, not on the entire set of partitionings, but on the particular partitioning that generates a cost that compares favorably to the first threshold.

Further, when the group selection signal has a second value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks and assigning the selected group to be the selected partitioning with the most favorable accumulated cost. Again, motion refinement module 206 can operate, not on the entire set of partitionings, but on the particular partitioning that generates the most favorable cost from the motion search.

In addition, when the group selection signal has a third value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a second threshold, and assigning the selected group to be each of partitionings of the plurality of partitionings with accumulated cost that compares favorably to the second threshold. In this mode, motion refinement module 206 can operate, not on the entire set of partitionings, but only on those partitionings that generate a cost that compares favorably to the second threshold.

As discussed above, the motion search module 204 and motion refinement module 206 can be pipelined and operate to contemporaneously generate the motion search motion vector for the plurality of subblocks for a plurality of partitionings of a macroblock of a plurality of macroblocks, in parallel. In addition, shared memory 205 can be closely coupled to both motion search module 204 and motion refinement module 206 to efficiently store the results for selected group of partitionings from the motion search module 204 for use by the motion refinement module 206. In particular, motion search module 204 stores the selected group of partitionings and the corresponding motion search motion vectors in the shared memory and other results in the cost and hint tables. Motion refinement module 206 retrieves the selected group of partitionings and the corresponding motion search motion vectors from the shared memory. In a particular embodiment, the motion search module 204 can generate a trigger signal in response to the storage of the selected group of partitionings of the macroblock and the corresponding motion search motion vectors and/or other results in the shared memory, and the motion refinement module 206 can commence the retrieval of the selected group of partitionings and the corresponding motion search motion vectors and/or other results from the shared memory in response to the trigger signal.

As discussed above, the motion refinement for a particular macroblock can be turned off by selectively disabling the motion refinement module for a particular application, compression standard, or a macroblock, For instance, a skip mode can be determines when the cost associated with the stationary motion vector compares favorably to a skip mode cost threshold or if the total cost associated with a particular partitioning compares favorably to a skip refinement cost threshold. In this skip mode, the motion search motion vector can be used in place of the refined motion vector. In yet another optional feature, the motion search module 204 generates a motion search motion vector for a plurality of subblocks for a plurality of partitionings of a macroblock of a plurality of macroblocks based one or several costs calculations such as on a sum of accumulated differences (SAD) cost, as previously discussed. However, motion refinement module 206, when enabled, generates a refined motion vector for the plurality of subblocks for the plurality of partitionings of the macroblock of the plurality of macroblocks, based on the motion search motion vector for each of the plurality of subblocks of the macroblock of the plurality of macroblocks based on a sum of accumulated transform differences (SATD) cost. In this case, the mode decision module 212 must operate on either SAD costs from the motion search module 204 or SATD costs from the motion refinement module 206.

Mode decision module 212 is coupled to the motion refinement module 206 and the motion search module 204. When the motion refinement module 206 is enabled for a macroblock, the mode decision module 212 selects a selected partitioning of the plurality of partitionings, based on SATD costs associated with the refined motion vector for each subblocks of the plurality of partitionings of the macroblock. In addition, when the motion refinement module 206 is disabled for the macroblock of the plurality of macroblocks, mode decision module 212 selects a selected partitioning of the plurality of partitionings, based on SAD costs associated with the motion search motion vector for each subblocks of the plurality of partitionings of the macroblock, and that determines a final motion vector for each subblocks corresponding to the selected partitioning of the macroblock.

Since the motion refinement engine 175 can operate in both a frame or field mode, mode decision module 212 selects one of a frame mode and a field mode for the macroblock, based on SATD costs associated with the refined motion vector for each subblocks of the plurality of partitionings of the macroblock, or based on SAD costs associated with the motion search motion vector for each subblocks of the plurality of partitionings of the macroblock.

In an embodiment of the present invention, the motion refinement engine 175 is designed to work through a command FIFO located in the shared memory 205. The functional flexibilities of the engine are made possible with a highly flexible design of the command FIFO. The command FIFO has four 32-bit registers, of which one of them is the trigger for the motion refinement engine 175. It could be programmed so as to complete the motion refinement/compensation for a single partition, group of partitions or an entire MB/MB pair, with or without MBAFF, for forward, backward and blended directions with equal ease. It should be noted that several bits are reserved to support future features of the present invention.

In a particular embodiment, the structure of the command FIFO is as summarized in the table below.

| Field Name | Bit Position | Description |
|---|---|---|
| TASK | 1:0 | 0 = Search/refine<br>1 = Direct<br>2 = Motion Compensation/Reconstruction<br>3 = Decode |
| DIRECTION | 4:2 | Bit 0: FWD<br>Bit 1: BWD<br>Bit 2: Blended |
| WRITE_COST | 5 | 0 = Don't write out Cost<br>1 = Write out Cost |
| PARTITIONS | 51:6 | Which partitions to turn on and off. This is interpreted in accordance with a MBAFF Flag |
| TAG | 58:52 | To tag the Index FIFO entry-7 bits |
| DONE | 59 | Generate Interrupt when finished this entry |
| PRED_DIFF_INDEX | 63:60 | Which Predicted and Difference Index to write to |
| CURR_Y_MB_INDEX | 67:64 | Which Current Y MB Index to read from |
| CURR_C_MB_INDEX | 71:68 | Which Current C MB Index to read from |
| FWD_INDEX | 75:72 | FWD Command Table Index to parse through |
| BWD_INDEX | 79:76 | BWD Command Table Index to parse through |
| BLEND_INDEX | 83:80 | BLEND Command Table Index to write to |
| Reserved | 84 | |
| THRESHOLD_ENABLE | 85 | Perform Refinement only for the partitions indicated by the threshold table. |
| BEST_MB_PARTITION | 86 | Use only the Best Macroblock partition. This will ignore the PARTITIONS field in this index FIFO entry |
| Reserved | 87 | |
| DIRECT_TOP_FRM_FLD_SEL | 89:88 | 00: None, 01: Frame, 10: Field, 11: Both |
| DIRECT_BOT_FRM_FLD_SEL | 91:90 | 00: None, 01: Frame, 10: Field, 11: Both |
| WRITE_PRED_PIXELS | 93:92 | 0 = Don't write out Predicted Pixels<br>1 = Write out Top MB Predicted Pixels<br>2 = Write out Bottom MB Predicted Pixels<br>3 = Write out both Top and Bottom MB Predicted Pixels<br>(turned on for the last entry of motion compensation) |
| WRITE_DIFF_PIXELS | 95:94 | 0 = Don't Write out Difference Pixels<br>1 = Write out Top MB Difference Pixels<br>2 = Write out Bottom MB Difference Pixels<br>3 = Write out both Top and Bottom MB Predicted Pixels<br>(Note: In Motion Compensation Mode, this will write out the Motion Compensation Pixels and will be turned on for the last entry of motion compensation) |

-continued

| Field Name | Bit Position | Description |
|---|---|---|
| CURR_MB_X | 102:96 | Current X coordinate of Macroblock |
| Reserved | 103 | |
| CURR_MB_Y | 110:104 | Current Y coordinate of Macroblock |
| Reserved | 111 | |
| LAMBDA | 118:112 | Portion of weighted for cost |
| Reserved | 121:119 | |
| BWD_REF_INDEX | 124:122 | Backward Reference Index |
| FWD_REF_INDEX | 127:125 | Forward Reference Index |

In addition to the Command FIFO, there are also some slice level registers in the shared memory that the motion refinement engine 175 uses. These include common video information like codec used, picture width, picture height, slice type, MBAFF Flag, SATD/SAD flag and the like. By appropriately programming the above bits, the following flexibilities/scenarios could be addressed:

1. The task bits define the operation to be performed by the motion refinement engine 175. By appropriately combining this with the codec information in the registers, the motion refinement engine 175 can perform any of the above tasks for all the codecs as listed earlier.
2. The direction bits refer to the reference picture that needs to be used and are particularly useful in coding B Slices. Any combination of these 3 bits could be set for any of the tasks. By enabling all these 3 bits for refinement, the motion refinement engine 175 can complete motion refinement for the entire MB in all three directions in one call. However, the motion refinement engine 175 can also could select any particular direction and perform refinement only for that (as might be required in P slices). The command FIFO, thus offers the flexibility to address both cases of a single, all-directions call or multiple one-direction calls.
3. The partitions bits are very flexible in their design as they holistically cater to motion refinement and reconstruction for all partitions and sub partitions. By effectively combining these bits with the direction bits, the motion refinement engine 175 can achieve both the extremes i.e. perform refinement for all partitions for all the directions in one shot or perform refinement/compensation for a select set of partitions in a particular direction. The partition bits are also dynamically interpreted differently by the motion refinement engine 175 engine based on the MBAFF ON flag in the registers. Thus, using an optimized, limited set of bits, the motion refinement engine 175 can address an exhaustive scenario of partition combinations. The structure of the partition bits for each of these modes is summarized in the tables that follow for frame (FRM), field (FLD) and direct mode (DIRECT) results.

MBAFF On:

| Macroblock | Partition | Frm/Fld | Bit |
|---|---|---|---|
| TOP MB | 16 × 16 | FRM | 0 |
| | | FLD | 1 |
| | | DIRECT | 2 |
| | 16 × 8 Top Partition | FRM | 3 |
| | | FLD | 4 |
| | 16 × 8 Bottom Partition | FRM | 5 |
| | | FLD | 6 |
| | 8 × 16 Left Partition | FRM | 7 |
| | | FLD | 8 |

-continued

| Macroblock | Partition | Frm/Fld | Bit |
|---|---|---|---|
| | 8 × 16 Right Partition | FRM | 9 |
| | | FLD | 10 |
| | 8 × 8 Top Left Partition | FRM | 11 |
| | | FLD | 12 |
| | | DIRECT | 13 |
| | 8 × 8 Top Right Partition | FRM | 14 |
| | | FLD | 15 |
| | | DIRECT | 16 |
| | 8 × 8 Bottom Left Partition | FRM | 17 |
| | | FLD | 18 |
| | | DIRECT | 19 |
| | 8 × 8 Bottom Right Partition | FRM | 20 |
| | | FLD | 21 |
| | | DIRECT | 22 |
| BOT MB | 16 × 16 | FRM | 23 |
| | | FLD | 24 |
| | | DIRECT | 25 |
| | 16 × 8 Top Partition | FRM | 26 |
| | | FLD | 27 |
| | 16 × 8 Bottom Partition | FRM | 28 |
| | | FLD | 29 |
| | 8 × 16 Left Partition | FRM | 30 |
| | | FLD | 31 |
| | 8 × 16 Right Partition | FRM | 32 |
| | | FLD | 33 |
| | 8 × 8 Top Left Partition | FRM | 34 |
| | | FLD | 35 |
| | | DIRECT | 36 |
| | 8 × 8 Top Right Partition | FRM | 37 |
| | | FLD | 38 |
| | | DIRECT | 39 |
| | 8 × 8 Bottom Left Partition | FRM | 40 |
| | | FLD | 41 |
| | | DIRECT | 42 |
| | 8 × 8 Bottom Right Partition | FRM | 43 |
| | | FLD | 44 |
| | | DIRECT | 45 |

MBAFF Off:

| | Partition | | Bit |
|---|---|---|---|
| FRAME | 16 × 16 | Enable | 0 |
| | | DIRECT | 1 |
| | 6 × 8 Top Partition | | 2 |
| | 16 × 8 Bottom Partition | | 3 |
| | 8 × 16 Left Partition | | 4 |
| | 8 × 16 Right Partition | | 5 |
| | 8 × 8 Top Left Partition | 8 × 8 | 6 |
| | | 8 × 4 | 7 |
| | | 4 × 8 | 8 |
| | | 4 × 4 | 9 |
| | | DIRECT | 10 |
| | 8 × 8 Top Right Partition | 8 × 8 | 11 |
| | | 8 × 4 | 12 |
| | | 4 × 8 | 13 |
| | | 4 × 4 | 14 |
| | | DIRECT | 15 |

-continued

| Partition | | Bit |
|---|---|---|
| 8 × 8 Bottom Left Partition | 8 × 8 | 16 |
| | 8 × 4 | 17 |
| | 4 × 8 | 18 |
| | 4 × 4 | 19 |
| | DIRECT | 20 |
| 8 × 8 Bottom Right Partition | 8 × 8 | 21 |
| | 8 × 4 | 22 |
| | 4 × 8 | 23 |
| | 4 × 4 | 24 |
| | DIRECT | 25 |
| Reserved | | 45:26 |

The command FIFO also has early termination strategies, which could be efficiently used to speed up the motion refinement intelligently. These could be used directly in conjunction with the motion search module 204 or with the intervention of the processor 200 to suit the algorithmic needs. These are as follows:

a. BEST MB PARTITION: This is the super fast mode, which chooses only the best mode as indicated by the motion search to perform refinement on. Motion refinement only looks at the particular partition that are in the in the threshold table that are set based on the motion search results for the BEST partition only one frame or field.

b. THRESHOLD ENABLE: This flag is used to enable the usage of the threshold information in a motion search MS Stats Register. If this bit is ON, the motion refinement engine 175 performs refinement ONLY for the modes specified in the threshold portion of the MS Stats Register. This bit works as follows. For each of the Top/Bottom, Frame/Field MBs, do the following:

If any of the partition bits (any of 16×16, 16×8, 8×16, 8×8) are enabled in the threshold portion of the MS Stats Register (this means that thresholds have been met for those partitions), do all those enabled partitions irrespective of the PARTITION bits in the Command FIFO. For the MBAFF OFF case, when the 8×8 bit is set, refinement is done ONLY for the best sub partition as specified in a hint table for each of the 8×8 partitions. Motion refinement only looks at particular partitions that are in the threshold table that are set based on the motion search results for those partitions that meet the threshold.

Figure 13:
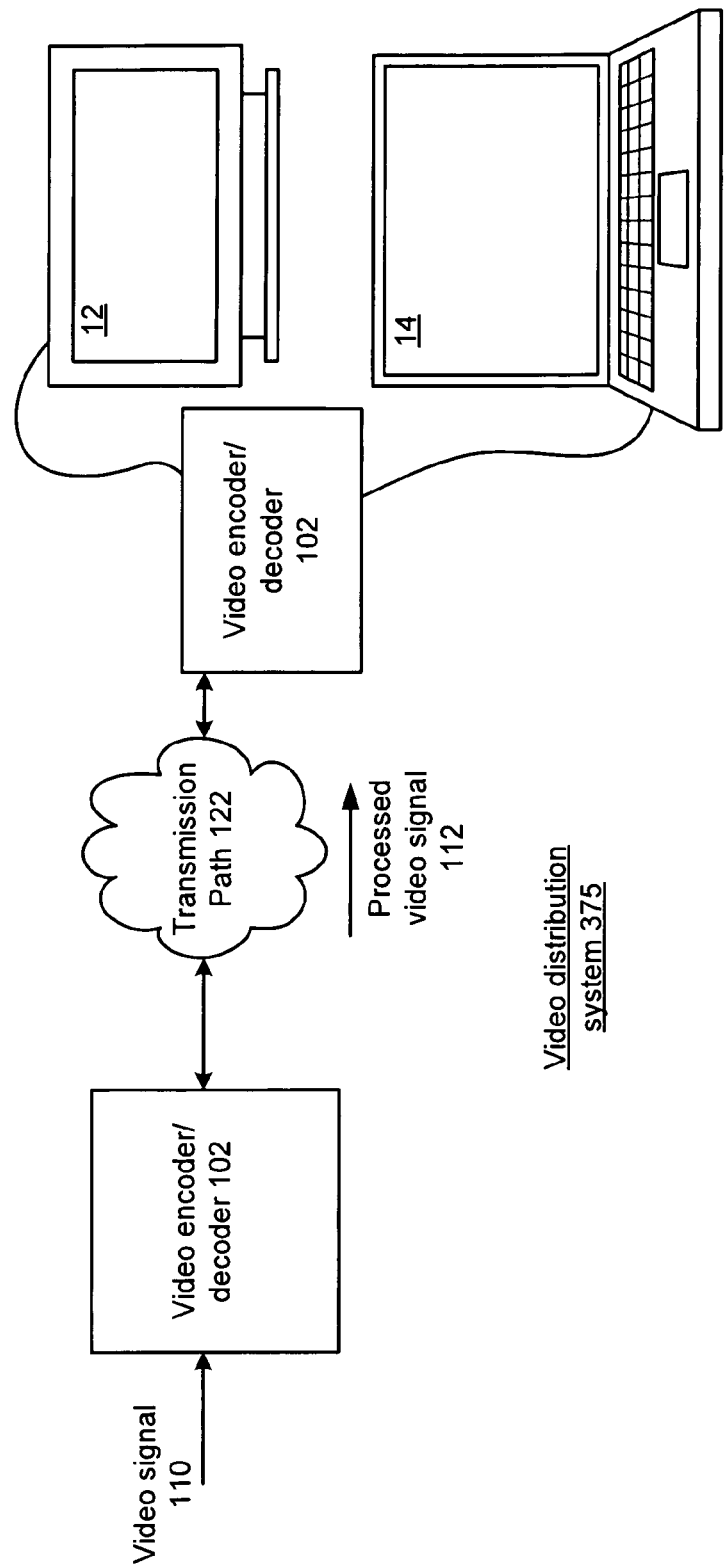
FIG. 13 presents a block diagram representation of a video distribution system 375 in accordance with an embodiment of the present invention.

FIG. 13 presents a block diagram representation of a video distribution system 375 in accordance with an embodiment of the present invention. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 14:
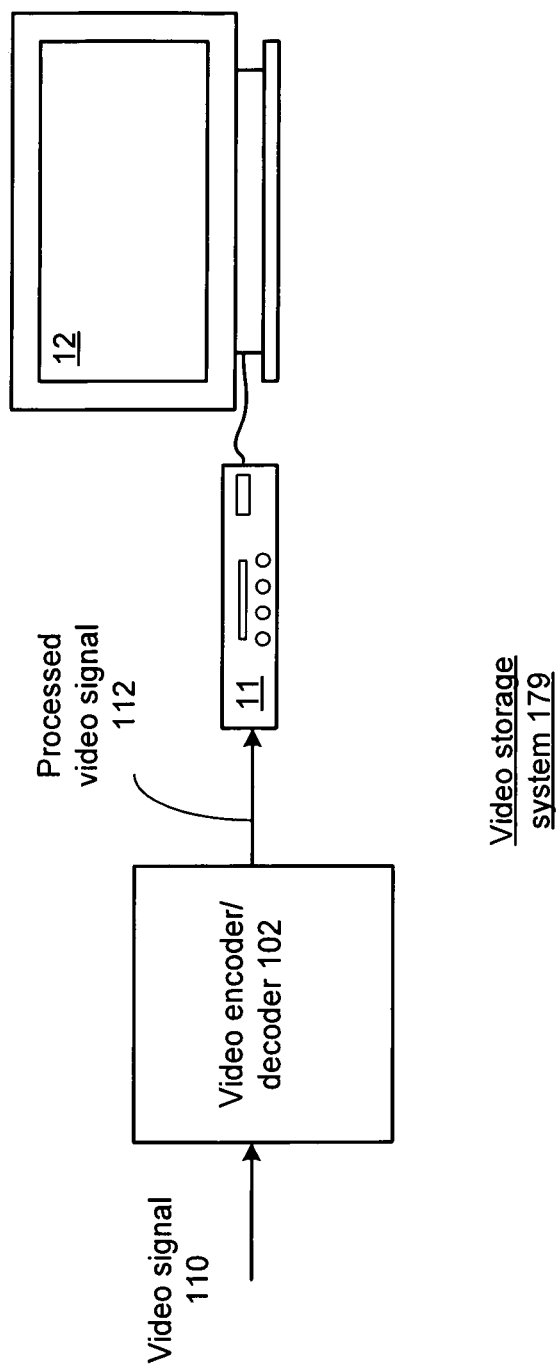
FIG. 14 presents a block diagram representation of a video storage system 179 in accordance with an embodiment of the present invention.

FIG. 14 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 15:
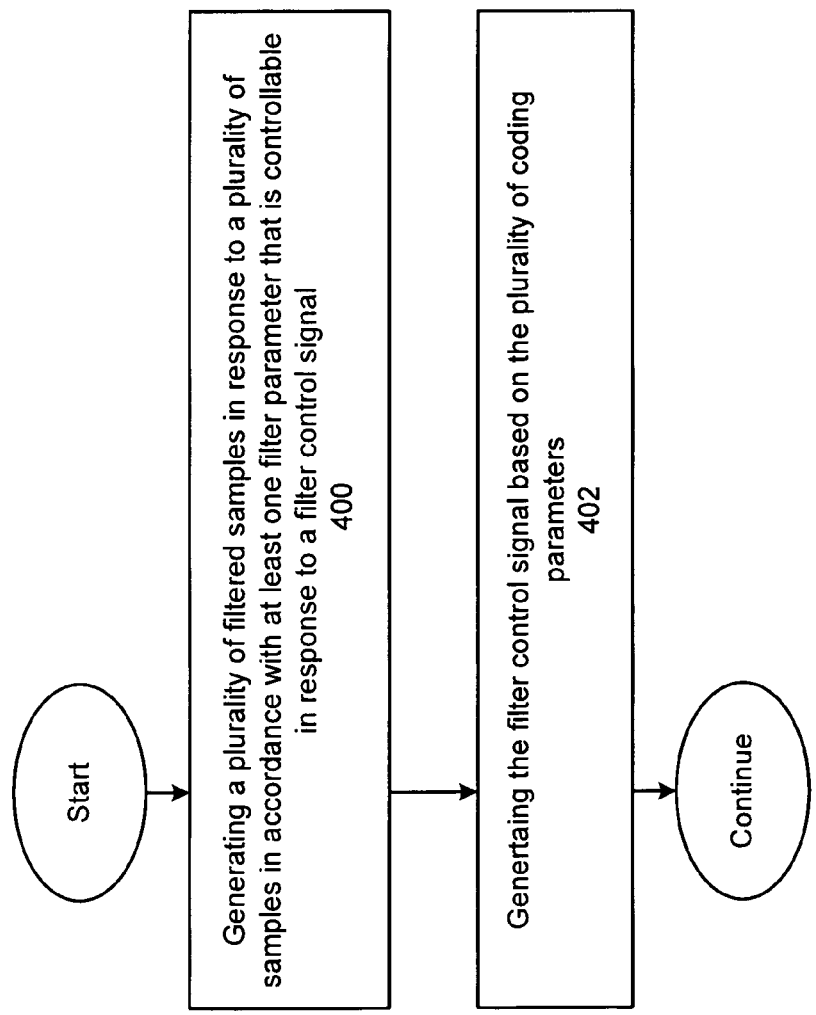
FIG. 15 presents a flowchart representation of a method in accordance with an embodiment of the present invention.

FIG. 15 presents a flowchart representation of a method in accordance with an embodiment of the present invention. In particular, a method is presented for use in conjunction with a video processing device having one or more of the features and functions described in association with FIGS. 1-14. In step 400, a plurality of filtered samples are generated in response to a plurality of samples in accordance with at least one filter parameter that is controllable in response to a filter control signal. In step 402, the filter control signal is generated based on the plurality of coding parameters.

In an embodiment of the present invention, the coding parameters include a plurality of quantization parameters of an encoded video signal. Step 402 can include processing the plurality of quantization parameters to generate a plurality of processed quantization parameters, and wherein the filter control signal is generated based on the processed quantization parameters.

The video processing device can generate a plurality of macroblocks of a video picture, each of the plurality of macroblocks having at least one edge, and wherein the processed quantization parameters include a quantization parameter value that represents a plurality of pixels along the edge. The video processing device can operate in a first mode with macroblock adaptive frame and field (MBAFF) processing enabled and a second mode with MBAFF processing disabled and wherein the plurality of coding parameters includes a MBAFF flag that indicates when MBAFF processing is enabled or disabled, wherein the plurality of coding parameters includes the MBAFF flag and wherein generating the filter control signal includes varying the plurality of pixels for the at least one edge based on the MBAFF flag. The at least one edge can include a vertical edge and a horizontal edge and wherein the processed quantization parameters include a first quantization parameter value that represents N pixels along the vertical edge and M pixels along the horizontal edge and wherein the filter control module varies N based on the MBAFF flag. The at least one edge can include a vertical edge and wherein the processed quantization parameters include a first quantization parameter value that represents N pixels along the vertical edge and wherein generating the filter control signal includes varying N based on a neighboring macroblock.

Step 400 can include generating a plurality of filtered samples includes varying the filter strength based on the filter control signal. The video processing device can generate a plurality of macroblocks of a video picture, and step 402 can generate a filter control signal for each macroblock of the plurality of macroblocks. The video processing device can generate a plurality of macroblocks of a video picture, each of the plurality of macroblocks having a plurality of edges, and the coding parameters can include a plurality of edge strengths.

The video processing device can generate a plurality of macroblocks of a video picture, wherein the video processing device operates in a first mode with macroblock adaptive frame and field (MBAFF) processing enabled and a second mode with MBAFF processing disabled and wherein the plurality of coding parameters includes a MBAFF flag that indicates when MBAFF processing is enabled or disabled, wherein the plurality of coding parameters include the MBAFF flag, and wherein the coding parameters include macroblock data formatted in accordance with a macroblock pair.

The video processing device can generate a plurality of macroblocks of a video picture, wherein the video processing device operates in a first mode with macroblock adaptive frame and field (MBAFF) processing enabled and a second mode with MBAFF processing disabled and wherein the plurality of coding parameters includes a MBAFF flag that indicates when MBAFF processing is enabled or disabled, wherein the plurality of coding parameters include the MBAFF flag, and wherein the coding parameters include a macroblock type.

The video processing device can operate in a plurality of transform modes indicated by the transform type, and wherein the coding parameters include the transform type.

In an embodiment of the present invention, the encoding mode and the decoding mode each operate in one of an H.264 standard, a Motion Picture Experts Group (MPEG) standard, and a Society of Motion Picture and Television Engineers (SMPTE) standard. Further the encoding mode and the decoding mode can selectively operate in accordance with a first standard when a standard selection signal has a first value and in accordance with a second standard when the standard selection signal has a second value.

In preferred embodiments, the circuit components of motion refinement engine 175 are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video processing device, a video encoder/decoder and deblocking filter module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A deblocking filter module for use in a video processing device that processes a video input signal in accordance with a plurality of coding parameters wherein the video processing device operates in a first mode with macroblock adaptive frame and field (MBAFF) processing enabled and a second mode with MBAFF processing disabled and a processing module generates a MBAFF flag that alternatively indicates one of: the first mode and the second mode, the deblocking filter module comprising:
    an adaptive deblocking filter, coupled to receive a plurality of samples and to produce a plurality of filtered samples in response thereto, the adaptive deblocking filter having at least one filter parameter that is controlled, and wherein the at least one filter parameter is controlled in response to a filter control signal to vary a filter strength from a first filter strength in the first mode of the MBAFF flag to a second filter strength in the second mode of the MBAFF flag; and
    a filter control module, coupled to the adaptive deblocking filter, that generates the filter control signal based on the MBAFF flag.

2. The deblocking filter module of claim 1 wherein the plurality of coding parameters include a plurality of quantization parameters of an encoded video signal and wherein the filter control module generates the filter control signal further based on the plurality of coding parameters.

3. The deblocking filter module of claim 2 wherein the filter control module processes the plurality of quantization parameters to generate a plurality of processed quantization parameters, and wherein the filter control signal is generated based on the processed quantization parameters.

4. The deblocking filter module of claim 3 wherein the video processing device generates a plurality of macroblocks of a video picture, each of the plurality of macroblocks having at least one edge, and wherein the processed quantization parameters include a quantization parameter value that represents a plurality of pixels along the at least one edge.

5. The deblocking filter module of claim 4 wherein the filter control module varies the plurality of pixels for the at least one edge based on the MBAFF flag.

6. The deblocking filter module of claim 5 wherein the at least one edge includes a vertical edge and a horizontal edge and wherein the processed quantization parameters include a first quantization parameter value that represents N pixels along the vertical edge and M pixels along the horizontal edge and wherein the filter control module varies N based on the MBAFF flag.

7. The deblocking filter module of claim 5 wherein the at least one edge includes a vertical edge and wherein the processed quantization parameters include a first quantization parameter value that represents N pixels along the vertical edge and wherein the filter control module varies N based on a neighboring macro block.

8. The deblocking filter module of claim 2 wherein the video processing device generates a plurality of macroblocks of a video picture, wherein the coding parameters include macroblock data formatted in accordance with a macroblock pair and wherein the coding parameters include a macroblock type.

9. The deblocking filter module of claim 2 wherein the video processing device operates in a plurality of transform modes indicated by the transform type, and wherein the coding parameters include the transform type.

10. The deblocking filter module of claim 1 wherein the video processing device generates a plurality of macroblocks of a video picture, and wherein the filter control module generates a separate filter control signal for each macroblock of the plurality of macroblocks.

11. The deblocking filter module of claim 1 wherein the video processing device generates a plurality of macroblocks of a video picture, each of the plurality of macroblocks having a plurality of edges, wherein the coding parameters include a plurality of edge strengths.

12. A method for use in a video processing device that processes a video input signal in accordance with a plurality of coding parameters, wherein the video processing device operates in a first mode with macroblock adaptive frame and field (MBAFF) processing enabled and a second mode with MBAFF processing disabled and a processing module generates a MBAFF flag that alternatively indicates one of: the first mode and the second mode, the method comprising:
  generating a plurality of filtered samples in response to a plurality of samples in accordance with at least one filter parameter that is controlled, and wherein the at least one filter parameter is controlled in response to a filter control signal to vary a filter strength from a first filter strength in the first mode of the MBAFF flag to a second filter strength in the second mode of the MBAFF flag; and
  generating the filter control signal based on the MBAFF flag.

13. The method of claim 12 wherein the plurality of coding parameters include a plurality of quantization parameters of an encoded video signal and wherein the filter control signal is generated further based on the plurality of coding parameters.

14. The method of claim 13 wherein generating the filter control signal includes processing the plurality of quantization parameters to generate a plurality of processed quantization parameters, and wherein the filter control signal is generated based on the processed quantization parameters.

15. The method of claim 14 wherein the video processing device generates a plurality of macro blocks of a video picture, each of the plurality of macro blocks having at least one edge, and wherein the processed quantization parameters include a quantization parameter value that represents a plurality of pixels along the at least one edge.

16. The method of claim 15 wherein generating the filter control signal includes varying the plurality of pixels for the at least one edge based on the MBAFF flag.

17. The method of claim 15 wherein the at least one edge includes a vertical edge and a horizontal edge and wherein the processed quantization parameters include a first quantization parameter value that represents N pixels along the vertical edge and M pixels along the horizontal edge and wherein the filter control module varies N based on the MBAFF flag.

18. The method of claim 15 wherein the at least one edge includes a vertical edge and wherein the processed quantization parameters include a first quantization parameter value that represents N pixels along the vertical edge and wherein generating the filter control signal includes varying N based on a neighboring macro block.

19. The method of claim 13 wherein the video processing device generates a plurality of macro blocks of a video picture, each of the plurality of macro blocks having a plurality of edges, wherein the coding parameters include a plurality of edge strengths.

20. The method of claim 13 wherein the video processing device generates a plurality of macro blocks of a video picture, and wherein the coding parameters include macroblock data formatted in accordance with a macroblock pair.

21. The method of claim 13 wherein the video processing device generates a plurality of macro blocks of a video picture, and wherein the coding parameters include a macroblock type.

22. The method of claim 13 wherein the video processing device operates in a plurality of transform modes indicated by the transform type, and wherein the coding parameters include the transform type.

23. The method of claim 12 wherein the video processing device generates a plurality of macroblocks of a video picture, and wherein generating the filter control signal includes generating a separate filter control signal for each macroblock of the plurality of macro blocks.

* * * * *